US009141009B2

(12) United States Patent
Hoefs et al.

(10) Patent No.: US 9,141,009 B2
(45) **Date of Patent: *Sep. 22, 2015**

(54) COATING COMPOSITION, SYSTEM INCLUDING THE COATING COMPOSITION, AND METHOD FOR SECURE IMAGES

(75) Inventors: Eugene Hoefs, Wheeling, WV (US); Michael R. Riley, Steubenville, OH (US); Kevin L. Heilman, Wheeling, WV (US)

(73) Assignee: TROY GROUP, INC., Costa Mesa, CA (US)

( * ) Notice: Subject to any disclaimer, the term of this patent is extended or adjusted under 35 U.S.C. 154(b) by 976 days.

This patent is subject to a terminal disclaimer.

(21) Appl. No.: 12/543,438

(22) Filed: Aug. 18, 2009

(65) Prior Publication Data

US 2010/0159137 A1 Jun. 24, 2010

Related U.S. Application Data

(60) Provisional application No. 61/139,510, filed on Dec. 19, 2008.

(51) Int. Cl.

*B32B 3/00* (2006.01)
*C08K 9/04* (2006.01)
*B05D 5/00* (2006.01)

(Continued)

(52) U.S. Cl.

CPC .............. *G03G 7/0013* (2013.01); *G03G 7/002* (2013.01); *G03G 9/0906* (2013.01); *G03G 9/0926* (2013.01)

(58) Field of Classification Search

CPC . G03G 7/0013; G03G 7/002; G03G 15/6582; G03G 2215/00299; G03G 9/0926; G03G 9/0906; G03G 9/0831; G03G 9/08782; G03G 9/08791; G03G 9/0928; G03G 9/0902; G03G 9/08795; G03G 9/08797; G03G 9/09; G03G 21/043; G03G 9/097; G03G 7/018; G03G 9/0817; G03G 9/081; G03G 9/083

USPC ............. 427/526; 524/430, 445, 447; 430/97, 430/10, 120

See application file for complete search history.

(56) References Cited

U.S. PATENT DOCUMENTS 4,496,961 A 1/1985 Devrient
4,936,607 A 6/1990 Brunea et al.

(Continued)

OTHER PUBLICATIONS

PCT Notification of Transmittal of the International Preliminary Report on Patentability and the Written Opinion of the International Searching Authority dated Jun. 30, 2011 for International Application No. PCT/US2009/068536 filed Dec. 17, 2009.

(Continued)

*Primary Examiner* — Mark Ruthkosky
*Assistant Examiner* — Laura C Powers

(57) ABSTRACT

A coating composition, system, and method for printing documents that are difficult to chemically or physically forge and that are easy to visually verify are disclosed. The system includes a substrate, a toner, including a colorant and a dye, a primary migration-enhancing coating applied using an offset printing process and optionally a secondary migration-enhancing coating applied using an offset printing process. An image formed using the toner of the invention is readily verified by comparing a colorant-formed image and a dye-formed image. In addition, if a solvent is used in an attempt to alter the printed image on the substrate, the dye migrates or diffuses to indicate tampering with the document.

25 Claims, 3 Drawing Sheets

(51) Int. Cl.
*G03G 7/00* (2006.01)
*G03G 9/09* (2006.01)

(56) References Cited

U.S. PATENT DOCUMENTS

| | | | | |
|---|---|---|---|---|
| 4,942,410 | A | 7/1990 | Fitch et al. | |
| 4,958,173 | A | 9/1990 | Fitch et al. | |
| 5,033,773 | A | 7/1991 | Brunea et al. | |
| 5,066,558 | A * | 11/1991 | Hikake et al. | 430/108.7 |
| 5,123,999 | A | 6/1992 | Honnorat et al. | |
| 5,124,217 | A | 6/1992 | Gruber et al. | |
| 5,366,833 | A | 11/1994 | Shaw et al. | |
| 5,523,167 | A | 6/1996 | Hunt et al. | |
| 5,666,598 | A | 9/1997 | Sugita et al. | |
| 5,698,616 | A | 12/1997 | Baker et al. | |
| 5,714,291 | A | 2/1998 | Marinello et al. | |
| 6,991,883 | B2 | 1/2006 | Riley et al. | |
| 6,998,211 | B2 | 2/2006 | Riley et al. | |
| 7,220,524 | B2 | 5/2007 | Heilman et al. | |
| 7,220,525 | B2 | 5/2007 | Riley et al. | |
| 2003/0236331 | A1 * | 12/2003 | Sasakura et al. | 524/270 |
| 2004/0038143 | A1 | 2/2004 | Riley et al. | |
| 2005/0058921 | A1 * | 3/2005 | Heilman et al. | 430/97 |
| 2005/0064209 | A1 | 3/2005 | Haines et al. | |
| 2005/0131103 | A1 * | 6/2005 | Hassan et al. | 523/160 |
| 2005/0282077 | A1 | 12/2005 | Riley et al. | |
| 2007/0231725 | A1 | 10/2007 | Riley et al. | |
| 2008/0070145 | A1 * | 3/2008 | Onda et al. | 430/110.4 |

OTHER PUBLICATIONS

Extended European Search Report, Appl. No. 09837928.2; issued Apr. 2, 2013; 7 pages.

* cited by examiner

COATING COMPOSITION, SYSTEM INCLUDING THE COATING COMPOSITION, AND METHOD FOR SECURE IMAGES

CROSS REFERENCE TO RELATED APPLICATIONS

This application claims the benefit of Provisional Application No. 61/139,510, entitled A SYSTEM AND METHOD FOR PRODUCING A SECURE DOCUMENT USING TONER-BASED IMAGING, filed Dec. 19, 2008, the entire disclosure being incorporated herein by reference.

FIELD OF INVENTION

The present invention relates to compositions, systems, and methods for printing documents. More particularly, the invention relates to an improved coating composition for printing documents in a secure manner, such that the documents are difficult to forge and original versions of the documents are readily verifiable, and to a system including the coating composition and to methods of using and making the coating composition.

BACKGROUND OF THE INVENTION

Toner-based imaging, which generally involves forming an electrostatic or magnetic image on a charged or magnetized photoconductive plate or drum, brushing the plate or drum with charged or magnetized toner, transferring the image onto a substrate such as paper, and fusing the toner onto the substrate using heat, pressure, and/or a solvent, can be used to form relatively inexpensive images on a surface of a substrate.

Because toner-based imaging, such as printing, is a relatively quick and inexpensive technique for producing copies of images, the technique is often employed to produce documents that were traditionally formed using other forms of printing or imaging—e.g., impact printing or ink-jet printing. For example, in recent years, toner-based imaging has been employed to produce financial documents, such as personal checks, stocks, and bank notes; legal documents such as wills and deeds; medical documents such as drug prescriptions and doctors' orders; and the like. Unfortunately, because the image is formed on the surface of the substrate, documents produced using toner-based imaging techniques may be relatively easy to forge and/or duplicate.

Various techniques for printing or forming secure documents have been developed over the years. For example, U.S. Pat. No. 5,124,217, issued to Gruber et al. on Jun. 23, 1992, discloses a secure printing toner for electrophotographic processing. This toner, when exposed to a solvent such as toluene, often used in document forgery, produces a color stain indicative of the attempted forgery. This toner is only useful to disclose an attempted forgery when a particular solvent is used to remove a portion of a printed image. Thus, the toner cannot be used to mitigate copying of the document or forgery by adding material to the document.

U.S. Pat. No. 5,714,291, issued to Marinello et al. on Feb. 3, 1998, discloses another toner that includes submicron ultraviolet sensitive particles. Authenticity of the document can be verified using an ultra-violet scanner. Requiring use of an ultra-violet scanner is generally undesirable because it adds cost to a forgery analysis and requires additional equipment.

Other techniques for producing secure images include modifying the paper onto which the image is printed. Such modified papers may include paper having a low-ink-absorption coating and paper including crushable micro capsules that contain leuco ink and a color acceptor. Although techniques including these forms of paper work relatively well for impact-type printing or copying, the techniques would not work well in connection with toner-based or similar printing methods.

Other techniques for producing secure images include providing special paper coatings to increase smudge resistance of an image created by an electrostatic process. However, the coatings generally do not affect an ability to add material to the document or authenticate the originality of the document.

For the foregoing reasons, improved compositions, methods and apparatus for forming secure documents using toner-based processing, which are relatively easy and inexpensive, are desired.

SUMMARY OF THE INVENTION

The present invention provides an improved coating composition, system and method for producing secure documents. Various ways in which the present invention addresses the drawbacks of the prior art are addressed below. In general, however, the coating composition, system, and method of the present invention produce images that are difficult to alter and that are relatively easy to assess whether an alteration to the image has been attempted or made.

In accordance with various embodiments of the invention, a system includes a substrate, a toner that includes a colorant and a dye applied to a surface of the substrate, and a primary migration-enhancing coating. In accordance with various aspects of these embodiments, the system further includes a secondary migration-enhancing coating. The secondary coating may be configured as a barrier between the first coating and other substrates and/or to minimize effects of different substrates. In accordance with further aspects of these embodiments, the toner is applied using a laser printer. And, in accordance with yet additional aspects, the primary migration-enhancing coating and/or secondary migration-enhancing coating is applied using an offset printing process. As discussed in more detail below, using an offset printer to apply the primary and/or secondary migration-enhancing coating allows for application of the coating(s) to select areas of the substrate-within the registration of the printer.

In accordance with additional embodiments of the invention, a coating composition, e.g., a composition for application of a primary migration-enhancing coating, used for producing secure images, includes an oil, a resin, an anti-misting agent, and an anti-offsetting agent. In accordance with various exemplary aspects, the primary coating composition is configured for application to a substrate using offset printing.

In accordance with yet additional embodiments of the invention, a coating composition, e.g., a composition for application of a secondary migration-enhancing coating, includes a high viscosity oil with low surface tension and an anti-misting agent. In accordance with various aspects of these embodiments, the secondary migration-enhancing coating composition includes a plurality of oils. In accordance with further exemplary aspects, the secondary coating composition is configured for application to a substrate using offset printing.

In accordance with yet further embodiments of the invention, a method of forming a secure document includes the steps of providing a substrate, applying a colorant and a dye to the substrate, and applying a primary migration-enhancing coating to the substrate using an offset printing (e.g., offset lithography) process. In accordance with various aspects of these embodiments, the process further includes the step of applying a secondary migration-enhancing coating. In accordance with further aspects, the secondary migration-enhancing coating is applied using offset printing techniques. As set forth in more detail below, the colorant and dye and the primary and secondary migration-enhancing coatings may be applied to the same surface of the substrate, or the colorant and dye may be applied to a first surface of the substrate and the primary and/or secondary migration-enhancing coatings may be applied to a second surface of the substrate.

In accordance with additional embodiments of the invention, a method of forming a secure document includes the steps of providing a substrate, applying a colorant and dye to the substrate, applying a primary migration-enhancing coating to the substrate, and applying a secondary migration-enhancing coating overlying the primary migration-enhancing coating. In accordance with various aspects of these embodiments, the primary migration-enhancing coating is applied using offset printing techniques. In accordance with further aspects, the secondary migration-enhancing coating is applied using offset printing techniques.

BRIEF DESCRIPTION OF THE DRAWINGS

A more complete understanding of the present invention may be derived by referring to the detailed description and claims, considered in connection with the figures, wherein like reference numbers refer to similar elements throughout the figures, and:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The following description is provided to enable a person skilled in the art to make and use the invention and sets forth the best mode contemplated by the inventors of carrying out their invention. Various modifications to the description, however, will remain readily apparent to those skilled in the art, since the general principles of a coating composition, system, and method for forming secure images on a document have been defined herein.

The present invention may be used in connection with a variety of printing processes, and is particularly well suited for toner and offset printing applications. The following description describes a coating composition, system, and method to produce secure documents using toner and lithographic offset processes. However, the invention is not limited to such composition, system, or process.

Exemplary coatings and systems in accordance with various embodiments of the invention may be used for a variety of purposes, such as to produce financial documents, such as personal checks, stocks, and bank notes; legal documents such as birth certificates, drivers' licenses, wills, and deeds; medical documents such as drug prescriptions, transcripts, and doctors' orders; educational documents, such as transcripts and records, and the like.

Figure 1:
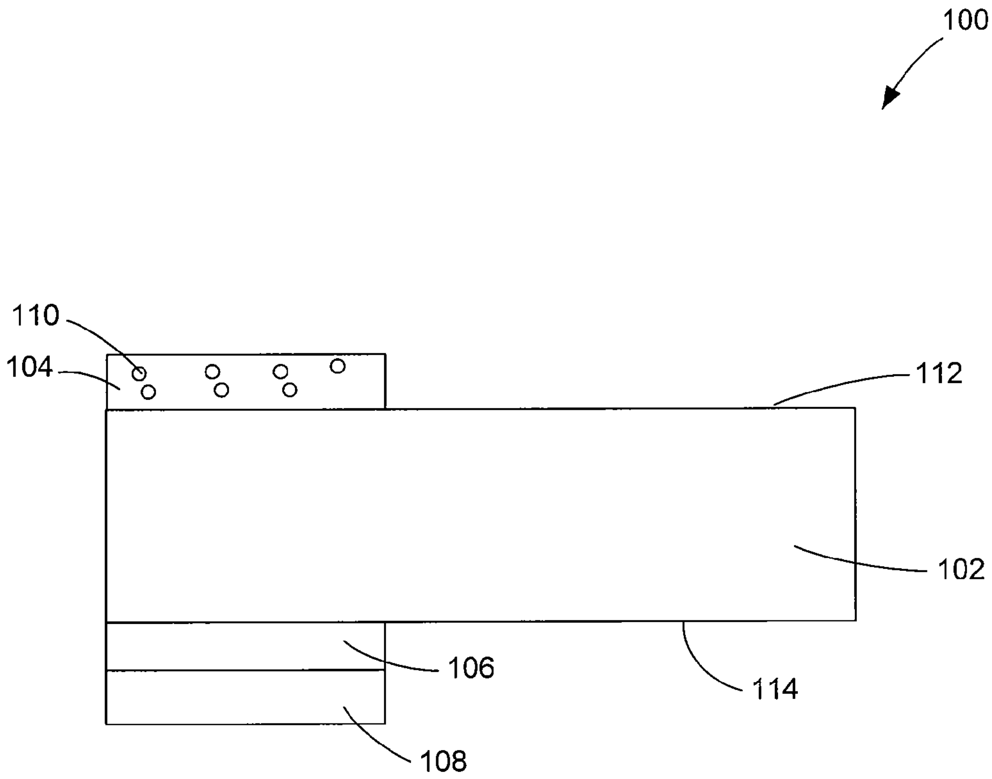
FIG. 1 illustrates a secure document system in accordance with various embodiments of the invention.

FIG. 1 illustrates a system 100, which includes a substrate 102, a toner 104, a first or primary migration-enhancing coating 106, a second or secondary migration-enhancing coating 108, and a dye 110. Although system 100 is illustrated with multiple coatings, as discussed in greater detail below, systems in accordance with alternative embodiments may include only a single coating or layer, wherein the single coating may include the attributes of one or both coatings 106 and 108. Furthermore, although coatings 106, 108 are illustrated as being directly opposite toner 104 on a second surface 114 of substrate 102, coatings 106 and/or 108 could alternatively be disposed on the same surface as, and underlying the toner 104.

Toner 104 and dye 110 function together with coatings 106 and 108 to provide a first image using toner 104 on a first surface 112 of substrate 102 and a latent image with dye 110 that may be visible from first surface 112 and/or second surface 114. In accordance with various embodiments of the invention, the secure image systems (e.g., system 100) are difficult to forge and copies of the secure images are easily detected, because any mismatch between the printed image and the latent image indicates an alteration or attempted alteration and a missing latent image is indicative of a copy of the document.

System 100 may be formed by applying a toner and a dye onto substrate 102 using, for example, an electrostatic or electrophotographic process, such as a laser printing process and applying coating 106 and/or coating 108 using an offset printing process (e.g., a lithographic process). Using an offset printing process to apply coatings 106 and/or 108 is advantageous because it allows the coating to be applied relatively inexpensively and, if desired, allows for precise application of the coatings only to desired areas of the substrate-within the precision of the register of the lithographic printer. In accordance with one embodiment of the invention, toner 104 and dye 110 are printed onto a first surface of a substrate and one or more coatings 106,108 are applied onto a second surface of the substrate. In accordance with alternative embodiments, coatings 106, 108 may be applied onto a first surface of the substrate and subsequently a toner-based image may be printed on top of the coating(s).

Figure 2:
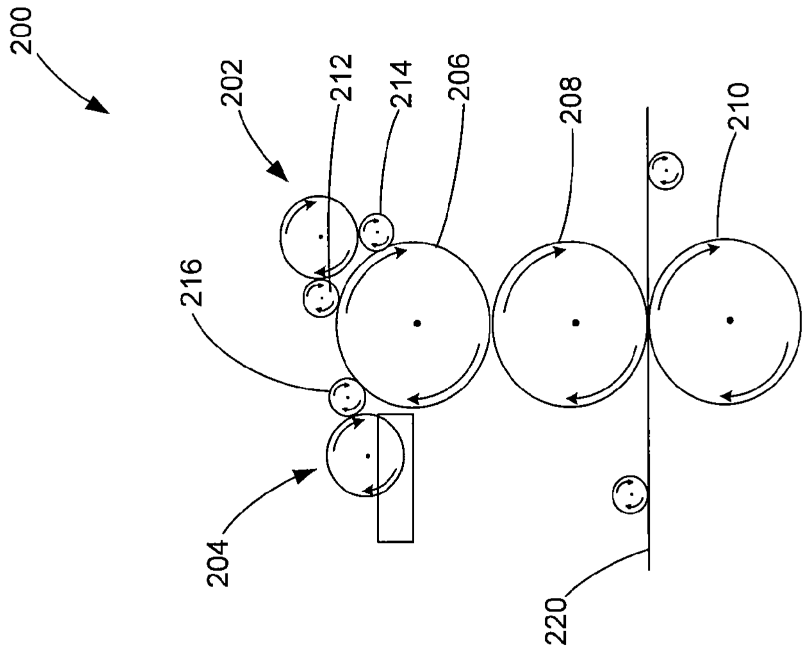
FIG. 2 illustrates an offset printing station for use with various embodiments of the invention.
Figure 3:
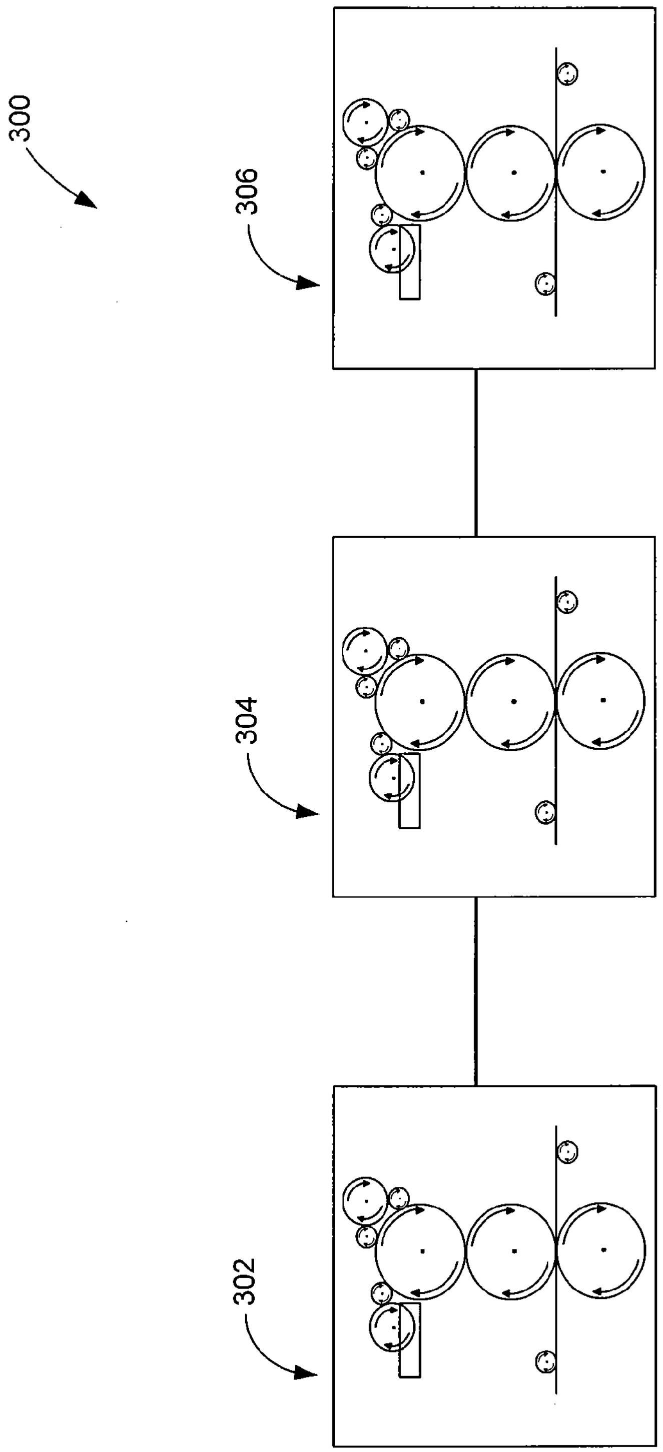
FIG. 3 illustrates an offset printing apparatus, including multiple stations, for use with various embodiments of the invention.

FIG. 2 illustrates a station and FIG. 3 illustrates an apparatus including multiple stations for application of coating 106 and/or 108 using offset printing, in accordance with various embodiments of the invention. Exemplary station 200 includes an ink or composition transfer system 202, a damping station 204, a plate cylinder 206, an offset cylinder 208, and an impression cylinder 210.

In accordance with various embodiments of the invention, during operation of station 200, a coating (e.g., coating 106) is applied to a substrate 220, such as paper, by first applying water from system 204, and then a coating composition from system 202, onto cylinder 206, using roller 216 and rollers 212-214, respectively. The coating composition and the water are immiscible, such that the water repels the coating composition from the non-image areas of cylinder 206 and the coating composition is applied to image areas of cylinder 206. The coating composition from cylinder 206 is then transferred to offset cylinder 208, which in turn, is used to transfer the coating composition to substrate 220. Coating 108 may be applied in the same manner. As noted above, applying coating compositions in this manner allows for very precise application of the coating compositions, which may be desirable to, for example, reduce an amount of coating material used to form system 100 and to mitigate unwanted diffusion of dye 110.

Apparatus 300 may be used to provide multiple images and/or coatings to a substrate using offset techniques. Apparatus 300 includes multiple stations 302, 304, and 306, each station generally including an ink or coating composition transfer system 202 to transfer an image or coating composition onto a substrate. By way of example, an image can be transferred to a substrate (e.g., substrate 102) using station 302. Station 304 is then used to apply layer or coating 106 onto substrate 102. Coating 106 may be applied substantially in register with and on an opposite surface with toner 104, as illustrated, or underlying toner 104. Similarly, if used, coating 108 can be applied overlying coating 106.

Referring back to FIG. 1, in accordance with various embodiments of the invention, substrate 102 may include any suitable material onto which an image can be transferred. Exemplary substrate 102 materials include paper (e.g., 20 lb. MOCR bond paper), and other substrates suitable for offset lithographic printing.

Toner 104 may include any suitable composition capable of printing an image on a surface of substrate 102. In accordance with various embodiments of the invention, toner 104 includes a thermoplastic binder resin, a colorant, a charge-controlling agent, and a migrating dye 110. Each of the thermoplastic binder resin, the colorant, release agent, and the charge-controlling agent may be the same as those used in typical toners. The toner may be a one-component toner or a multiple-component toner (e.g., toner and developer).

The thermoplastic binder resin helps fuse the toner to the substrate. In accordance with one embodiment of the invention, the binder resin has a melt index of between about 1 g/10 min. and 50 g/10 min. at 125° C. and has a glass transition temperature between about 50° C. and about 65° C. Exemplary materials suitable for the thermoplastic binder resin include polyester resins, styrene copolymers and/or homopolymers—e.g., styrene acrylates, methacrylates, styrene-butadiene-epoxy resins, latex-based resins, and the like. By way of particular example, the thermoplastic binder resin is a styrene butadiene copolymer sold by Eliokem as Pliolite S5A resin.

The colorant for use with toner 102 can be any colorant used for electrophotographic image processing, such as iron oxide, other magnetite materials, carbon black, manganese dioxide, copper oxide, and aniline black. In accordance with one particular example, the colorant is iron oxide sold by Rockwood Pigments as Mapico Black.

The charge-control agent helps maintain a desired charge within the toner to facilitate transfer of the image from, for example, an electrostatic drum, to the substrate. In accordance with one embodiment of the invention, the charge control agent includes negatively-charged control compounds that are metal-loaded or metal-free complex salts, such as copper phthalocyanine pigments, aluminum complex salts, quaternary fluoro-ammonium salts, chromium complex salt type axo dyes, chromic complex salt, and calix arene compounds.

The toner may also include a releasing agent such as a wax. The releasing agent may include low molecular weight polyolefins or derivatives thereof, such as polypropylene wax or polyethylene wax or a copolymer of polypropylene wax and polyethylene wax.

Preferred dyes in accordance with the present invention exhibit a strong color absorbance through a substrate (e.g., substrate 102), good solubility in a migration fluid, good stability, and dissolve and/or migrate in polar and/or non-polar solvents used to attempt document forgery—e.g., by attempting to remove an image from the top surface of the substrate. Exemplary polar solvents used in such attempted forgery include acetone, methanol, methyl ethyl ketone, and ethyl acetate; exemplary non-polar solvents include toluene, mineral spirits, gasoline, chloroform, heptane, and diethyl ether. In addition, the dyes are preferably indelible.

Exemplary soluble dyes, suitable for use as dye 110, include phenazine, stilbene, nitroso, triarylmethane, diarylmethane, cyanine, perylene, tartrazine, xanthene, azo, disazo, triphenylmethane, fluorane, anthraquinone, pyrazolone quinoline, and phthalocyanine. In accordance with one embodiment of the invention, the dye is red in color and is formed of xanthene, sold under the name Baso Red 546. In accordance with another embodiment of the invention, the dye is red in color and is formed of disazo, and sold under the name Bright Red LX-598. In accordance with yet another embodiment of the invention, the dye is blue in color and is formed of anthraquinone, sold under the name Bright Blue LX-9224. Other color dyes of similar chemical structure are also suitable for use with this invention.

Coating 106 includes a migration-enhancing agent configured to assist dye 110 to migrate through at least a portion of substrate 102. In accordance with various embodiments of the invention, coating 106 includes an oil as a migration-enhancing agent, a resin, and an anti-misting agent, such as silica, bentonite clay, kaolin, titanium dioxide, or any combination thereof. The anti-misting agent mitigates unwanted spray of coating material. The oil may be a single-component oil or include multiple components, such as oils, plasticizer, liquid polymers, and combinations thereof. By way of example, the oil may include one or more of the following compounds: benzyl butyl phthalate, his (2-ethylhexyl) adipate, trioctyl trimellitate, and 2,2,4-trimethyl-1,3-pentanediol diiosbutryate. The resin may be a phenolic modified rosin ester or other resin compound, yielding high viscosity (e.g., greater than about 70,000 cp) and low tack and low misting properties, such as Sylvaprint 87-85 available from Arizona Chemical.

In accordance with various aspects of these embodiments, coating 106 includes an anti-offsetting agent, such as silica, pea starch, wheat starch, silicone oil, a wax, or any combination thereof. The wax may be a synthetic wax, such as fluorocarbon wax, polyethylene, polypropulene, combinations thereof, or a natural wax, such as carnauba wax, or a combination of natural and synthetic waxes. In accordance with further aspects, a particle size of the anti-offsetting agent may range from about 0.2 microns to about 25 microns.

In accordance with further embodiments of the invention, a composition for application of coating 106 (e.g., a composition of a solution for station 202) includes about 25% to about 90%, about 35% to about 80%, or about 45% to about 75% oil; about 10% to about 60%, or about 20% to about 50%, or about 25% to about 45% resin; and about 0.1% to about 10%, or about 0.02% to about 5%, or about 0.05% to about 2% anti-misting agent. In accordance with various aspects of these embodiments, the composition includes about 0.1% to about 10%, or about 0.2% to about 5%, or about 0.5% to about 2% anti-offsetting agent and various combinations of these compounds. All percents set forth herein are in weight percent unless otherwise noted.

The following non-limiting examples illustrate various combinations of materials and processes useful in forming a composition in accordance with various embodiments of the invention. These examples are merely illustrative, and it is not intended that the invention be limited to these illustrative examples.

EXAMPLE 1

| Material | Amount |
|---|---|
| Oil | 64% |
| Resin | 33% |
| Silica | 1% |
| Pea Starch | 1% |

A composition for coating 106 was prepared by first heating a stirred mixture of the oil and the silica (e.g., Syloid Rad 2105 available from Grace Davidson) until a temperature of about 250° F. was reached. While continuing to increase the temperature of the mixture, the resin was slowly added to the mixture. After all the resin has been added and the temperature had reached about 320° F. and had not exceeded about 360° F., the mixture is held at about 360° F. until all of the resin is dissolved. The mixture was then allowed to cool to a temperature below about 135° F., and then the pea starch was added. The mixture was mixed until the pea starch (e.g., pea starch available from Nutri-Pea Limited) was fully dispersed.

After the mixture had cooled to about 70° F., the viscosity of the mixture was measured with a falling rod viscometer. The viscosity of the composition at about 70° F. was between about 40,090 cps and 95,000 cps. The coating was applied to the paper with an offset press (e.g., using station 202). The amount of coating applied was in the range of about 0.3 mg/sq. inch to about 4 mg/sq. inch.

EXAMPLE 2

| Material | Amount, |
|---|---|
| Oil | 64% |
| Resin | 33% |
| Silica | 1% |
| Wax | 1% |

Another composition for application of coating 106 was prepared by first heating a stirred mixture of the oil, the wax, and the silica until a temperature of about 250° F. was reached. While continuing to increase the temperature of the mixture, the resin was slowly added to the mixture. After all the resin had been added and the temperature had reached about 320° F. but had not exceeded 360° F., the mixture was held at about 360° F. until all of the resin was dissolved. The mixture was mixed until the pea starch was fully dispersed.

After the mixture had cooled to about 70° F., the viscosity of the mixture was measured with a falling rod viscometer. An exemplary viscosity was between about 40,000 cps and 95,000 cps at about 70° F. The coating was applied to the paper with an offset press. The amount of coating applied was in the range of about 0.3 mg/sq. inch to about 4 mg/sq. inch.

EXAMPLE 3

| Material | Amount, % |
|---|---|
| Oil | 64% |
| Resin | 33% |
| Silica | 1% |
| Wax | 1% |

Yet another composition for application of coating 106 was prepared by first heating a stirred mixture of the oil, the wax and the silica until a temperature of about 250° F. was reached. The silica was a large particle size silica (e.g., about 9.0 microns) such as Sylysia 380, available from Fuji Sylysia Chemical Ltd. While continuing to increase the temperature of the mixture, the resin was slowly added to the mixture.

After all the resin had been added and the temperature had reached about 320° F. but not exceeded 360° F., the mixture was held at about 360° F. until all of the resin dissolved. The mixture was allowed to mix until the pea starch was fully dispersed.

After the mixture had cooled to about 70° F., the viscosity of the mixture was measured with a falling rod viscometer. An exemplary viscosity is between about 40,000 cps and 95,000 cps at about 70° F. The coating was applied to the paper with an offset press. The amount of coating applied was in the range of about 0.3 mg/sq. inch to about 4 mg/sq. inch.

As noted above, systems in accordance with various embodiments of the invention include a secondary migration-enhancing coating 108, which may be applied overlying coating 106. In accordance with various aspects, the composition for forming coating 108 includes a high viscosity oil (e.g., viscosity about or greater than about 100,000 cp) having a low surface tension and an anti-misting agent. The oil may be a single oil (e.g., a high-viscosity silicone oil) or a combination of oils (e.g., silicone oils) having different viscosities, such that the final viscosity of the composition is suitable for offset printing. The anti-misting agent may include any of the anti-misting agents noted above.

In accordance with further embodiments of the invention, a composition for application of coating 108 (e.g., a composition of a solution for station 202) includes about 70% to about 99.9%, about 85% to about 99.5%, or about 95% to about 99% of a first silicone fluid; and about 0.1% to about 30%, or about 0.2% to about 15%, or about 0.5% to about 2% silica. In accordance with various aspects of these embodiments, the composition includes about 0% to about 50%, or about 10% to about 30%, or about 15% to about 25% of a second silicone fluid. Exemplary first silicone fluids include moderately-high (10,000±5000 cp) to high viscosity (about 100,000 cp) di-methyl silicones fluids, and exemplary second silicone fluids include extremely high (about 1 million cp) viscosity di-methyl silicones fluids.

The following examples illustrate various compositions that may be used to form coating 108 using, e.g., an offset printer.

EXAMPLE 4

| Material | Amount |
|---|---|
| Silicone Fluid | 99% |
| Silica | 1% |

A secondary migration-enhancing coating according to this example was made by weighing a desired amount of high viscosity silicone oil such as a di-methyl silicone (e.g., DM Fluid 100,000, sold by Shin-Etsu Chemical) and a five micron silica powder into a vessel equipped with a stirrer. The solution was stirred until a uniform dispersion was obtained. The mixture can be heated to facilitate the mixing. After the mixture was well dispersed and cooled, the viscosity was measured. An exemplary viscosity range for the composition is between about 54,000 cps and about 100,000 cps at a temperature of about 70° F. The coating was applied via an offset printing press utilizing a station subsequent to the station used to apply coating 106. The amount of coating applied was in the range of about 0.2 mg/sq. inch to about 6 mg/sq. inch.

EXAMPLE 5

| Material | Amount |
|---|---|
| Extremely High Viscosity Silicone Fluid | 25% |
| Moderately High Viscosity Silicone Fluid | 74% |
| Silica | 1% |

A secondary migration-enhancing coating according to this example was made by weighing a desired amount of extremely high viscosity silicone oil such as a di-methyl silicone (e.g., oil having a viscosity of about 1 million cp or more, such as DM Fluid 1,000,000, sold by Shin-Etsu Chemical), moderately high viscosity silicone oil, such as a lower molecular weight di-methyl silicone (e.g., oil having a viscosity of about 10,000±5000 cp, such as DM Fluid 10,000, sold by Shin-Etsu Chemical), and a five micron silica powder into a vessel equipped with a stirrer. The solution was stirred until a uniform dispersion was obtained. The mixture can be heated to facilitate the mixing. After the mixture was well dispersed and cooled, the viscosity was measured. An exemplary viscosity range for the composition was between about 54,000 cps and about 100,000 cps at about 70° F. The coating was applied via an offset printing press utilizing a station subsequent to the station used to apply coating 106. The amount of coating applied was in the range of about 0.2 mg/sq. inch to about 6 mg/sq. inch.

Documents using the aforementioned coated substrates were printed in combination with the security toner described above using a Hewlett Packard Laserjet 4250 printer. Initially, the resulting image had high optical density, high resolution with no noticeable background, and no migration of the visible red dye was apparent. Within 24 hours, areas of printed toner were removed from the surface of the paper and it was observed that red residual images had started to work into the paper. Within 72 hours of printing, an indelible image became visible on the non-printed side of the paper. This measurement can be qualified by measuring the reflective optical density difference between the image on the second surface of the substrate and the non-image area on the second surface of the substrate. In accordance with various exemplary embodiments of the invention, an optical density difference of at least 0.07 optical density units measured 72 hours after the first side of the substrate has been printed with a laser printer is observed.

Although the present invention is set forth herein in the context of the appended drawing figures, it should be appreciated that the invention is not limited to the specific form shown. For example, while the invention is conveniently described in connection with electrostatic printing and offset printing, the invention is not so limited; the toner of the present invention may be used in connection with other forms of printing-such as iongraphic, magnetographic, and similar imaging techniques. Various other modifications, variations, and enhancements in the design and arrangement of the composition, method, and system set forth herein may be made without departing from the spirit and scope of the present invention as set forth in the appended claims.

We claim:

1. A system for producing a secure document using toner-based imaging, the system comprising:

a substrate having a first surface and a second surface;

a toner comprising a colorant and a dye, the toner applied to the first surface of the substrate, the colorant and dye forming an image on the first surface;

a first migration coating applied beneath the toner on the first or to the second surface of the substrate by offset printing to be substantially in register with the colorant and dye formed image;

whereby the first migration coating facilitates migration of the toner formed image from the first surface of the substrate into the substrate, forming an image visible from the second surface of the substrate.

2. The system of claim 1, wherein the first migration coating comprises an oil, a resin, an anti-misting agent and an anti-offsetting agent, the first migration coating having a falling-rod viscosity between 40,090 cps and 95,000 cps inclusive, measured at 70° F.

3. The system of claim 2, wherein the oil is a single component or a combination of one or more oils, plasticizers, and liquid polymers.

4. The system of claim 2, wherein the resin is a resin yielding high viscosity, and having low misting properties.

5. The system of claim 2, wherein the anti-misting agent comprises a compound selected from the group consisting of bentonite clay, silica, kaolin, titanium dioxide, and any combination thereof.

6. The system of claim 2, wherein the anti-offsetting agent comprises a compound having a size between about 0.2 microns and about 25 microns.

7. The system of claim 2, wherein the anti-offsetting agent comprises a compound selected from the group consisting of silica, pea starch, wheat starch, and any combination thereof.

8. The system of claim 2, wherein the anti-offsetting agent comprises a synthetic wax, a natural wax, or a combination thereof.

9. The system of claim 8, wherein the synthetic wax comprises a polyethylene, fluorocarbon wax, polypropylene, or any combination thereof.

10. The system of claim 8, wherein the natural wax comprises carnauba wax.

11. The system of claim 1, further comprising a second migration coating applied to overlay the first migration coating.

12. The system of claim 11, wherein the second migration coating comprises a high viscosity oil with a low surface tension and an anti-misting agent.

13. The system of claim 12, wherein the anti-misting agent of the second migration coating is selected from the group consisting of bentonite clay, silica, kaolin, titanium dioxide, and any combination thereof.

14. The system of claim 11, wherein a composition to form the second migration coating comprises a combination of silicon oils having different viscosities, resulting in a final viscosity between 54,000 cps and 100,000 cps, inclusive, measured at 70° F. by falling-rod.

15. The system of claim 1, wherein a reflective optical density difference between the image in the substrate viewable from the second surface of the substrate and a non-image area viewable from the second surface of the substrate is at least about 0.07 optical density units measured 72 hours after the toner has been applied to the first surface.

16. A composition for forming a migration-enhancing coating on a substrate, the composition comprising an oil, a resin, an anti-misting agent and an anti-offsetting agent, the composition having a falling-rod viscosity between 40,090 cps and 95,000 cps, measure at 70° F.

17. The composition of claim 16, wherein the anti-misting agent comprises a compound selected from the group consisting of bentonite clay, silica, kaolin, titanium dioxide, and any combination thereof.

18. The composition of claim 16, wherein the oil is a single component or a combination of one or more oils, plasticizers, and liquid polymers.

19. The composition of claim 16, wherein the resin is a resin yielding high viscosity, and having low misting properties.

20. The composition of claim 16, wherein the anti-offsetting agent comprises a compound having a size between about 0.2 microns and about 25 microns.

21. The composition of claim 16, wherein the anti-offsetting agent comprises a compound selected from the group consisting of silica, pea starch, wheat starch, and any combination thereof.

22. The composition of claim 16, wherein the anti-offsetting agent comprises a synthetic wax, a natural wax, or a combination thereof.

23. The composition of claim 22, wherein the synthetic wax comprises a polyethylene, fluorocarbon wax, polypropylene, or any combination thereof.

24. The composition of claim 22, wherein the natural wax comprises carnauba wax.

25. The system of claim 11, wherein the second migration coating is applied by offset printing.

* * * * *